(12) United States Patent
Hirakata

(10) Patent No.: US 6,800,389 B2
(45) Date of Patent: Oct. 5, 2004

(54) HEAT EXCHANGE SYSTEM

(75) Inventor: Syuji Hirakata, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/797,935

(22) Filed: Mar. 5, 2001

(65) Prior Publication Data

US 2001/0019789 A1 Sep. 6, 2001

(30) Foreign Application Priority Data

Mar. 6, 2000 (JP) ........................................ 2000-060806

(51) Int. Cl.[7] .............................................. H01M 8/06
(52) U.S. Cl. ........................ 429/26; 180/65.1; 180/65.3
(58) Field of Search ......................... 429/26; 180/65.1, 180/65.3

(56) References Cited

U.S. PATENT DOCUMENTS

| | | | |
|---|---|---|---|
| 6,309,774 B1 | * | 10/2001 | Buchner et al. ............... 429/38 |
| 6,322,920 B1 | * | 11/2001 | Tomson ......................... 429/34 |
| 6,492,043 B1 | * | 12/2002 | Knights et al. ................ 429/13 |
| 2002/0110713 A1 | * | 8/2002 | Reindl et al. .................. 429/22 |

FOREIGN PATENT DOCUMENTS

| | | |
|---|---|---|
| JP | A-2-88403 | 3/1990 |
| JP | 82-7-66828 | 7/1995 |
| JP | A-10-23713 | 1/1998 |

* cited by examiner

*Primary Examiner*—Carol Chaney
(74) *Attorney, Agent, or Firm*—Oblon, Spivak, McClelland, Maier & Neustadt, P.C.

(57) ABSTRACT

A heat exchange system includes a fuel cell that receives a specified gas and generates electric power, a heat exchange device that exchanges heat with a heat exchange medium, a heat exchange medium passage, and a gas detector. The heat exchange medium passage allows the heat exchange medium to circulate between the heat exchange device and the fuel cell such that the heat exchange medium can exchange heat with the heat exchange device and the fuel cell. The gas detector is disposed at at least one of the heat exchange device and the heat exchange medium passage to detect the specified gas that leaks into the heat exchange medium.

13 Claims, 4 Drawing Sheets

HEAT EXCHANGE SYSTEM

INCORPORATION BY REFERENCE

The disclosure of Japanese Patent Application No. 2000-060806 filed on Mar. 6, 2000 including the specification, drawings and abstract, is incorporated herein by reference in its entirety.

BACKGROUND OF THE INVENTION

1. Field of the Invention

The invention relates to a heat exchange system which feeds a heat exchange medium to a fuel cell so as to exchange heat with the fuel cell, or which feeds a heat exchange medium warmed through heat exchange with a heating element, to a gas absorbing device such as a hydrogen gas absorbing alloy tank, so as to heat the gas absorbing device.

2. Description of Related Art

In general, a fuel cell generates power in the manner as follows: hydrogen-containing fuel gas and oxygen-containing oxidizing gas are supplied to a fuel cell, so that electrochemical reactions take place at an anode and a cathode of the cell, according to reaction formulas as indicated below.

To be more specific, when the fuel gas and the oxidizing gas are supplied to the anode and the cathode, respectively, the reactions as represented by formulas (1) and (2) take place at the anode side and the cathode side, respectively, such that the fuel cell as a whole undergoes a reaction as represented by formula (3).

$$H_2 \rightarrow 2H^+ + 2e^- \qquad (1)$$

$$2H^+ + 2e^- + (\tfrac{1}{2})O_2 \rightarrow H_2O \qquad (2)$$

$$H_2 + (\tfrac{1}{2})O_2 \rightarrow H_2O \qquad (3)$$

Since these electrochemical reactions are heat generating or exothermic reactions, the inside of the fuel cell must be cooled in order to prevent the temperatures at the anode and the cathode from rising excessively. To this end, a heat exchange system is usually provided for feeding the fuel cell with cooling water as a heat exchange medium cooled by a radiator, through a cooling water passage, thereby to cool the inside of the fuel cell. One such type of heat exchange system for a fuel cell is disclosed in Japanese Patent Publication No. HEI 7-66828.

In some cases, the fuel gas to be fed to the fuel cell is supplied from a hydrogen absorbing alloy tank containing a hydrogen absorbing alloy. In general, hydrogen absorbing alloys have the property of releasing hydrogen through an endothermic reaction when heated, and of absorbing hydrogen through an exothermic reaction when cooled. Therefore, in order to extract hydrogen from the hydrogen absorbing alloy, the hydrogen absorbing alloy inside the hydrogen absorbing alloy tank must be heated as needed. To this end, the heat exchange system feeds the hydrogen absorbing alloy tank with cooling water that is a heat exchange medium warmed by heat exchange with a heating element such as a fuel cell, through a cooling water passage, thereby to heat the inside of the hydrogen absorbing alloy tank.

Thus, the heat exchange system feeds cooling water serving as a heat exchange medium to the fuel cell in order to cool it and to the hydrogen absorbing alloy tank in order to heat it.

In the fuel cell, the cooling water supplied to the cell is completely separated from the fuel gas and the oxidizing gas by separators in each single cell. When the fuel cell is used for an extended period of time, however, the sealing member that seals the periphery of each separator may deteriorate, causing the fuel gas or oxidizing gas to leak into the cooling water.

In the hydrogen absorbing alloy tank, the supplied cooling water runs through a tube while circulating within the tank, and is thus completely separated from hydrogen gas (that is, fuel gas). In some cases, the wall surface of the tube deteriorates after an extended period of use, and the hydrogen gas leaks into the cooling water.

In the conventional heat exchange system, however, no countermeasure has been taken against leakage of the fuel gas or oxidizing gas into the cooling water as the heat exchange medium. Thus, the heat exchange system may suffer from deterioration of heat exchange performance due to the presence of gas in the cooling water.

SUMMARY OF THE INVENTION

It is an object of the invention to provide a heat exchange system which can minimize the possibility of a specified gas leaking into a heat exchange medium.

To accomplish at least a part of the above object, a heat exchange system according to the first aspect of the invention includes a fuel cell that receives a specified gas and generates electric power, a heat exchange device that performs heat exchange with a heat exchange medium, a heat exchange medium passage, and a gas detector. The heat exchange medium passage circulates the heat exchange medium between the heat exchange device and the fuel cell such that the heat exchange medium can exchange heat with the heat exchange device and the fuel cell. A gas detector is provided at at least one of the heat exchange device and the heat exchange medium passage at a location to detect the specified gas that leaks into the heat exchange medium.

According to a second aspect of the invention, there is provided a heat exchange system which includes an exothermic body capable of generating heat, a gas absorbing device comprising a gas absorbing alloy that is able to absorb or release a specified gas, a heat exchange device configured and positioned to perform heat exchange with a heat exchange medium, a heat exchange medium passage and a gas detector. The heat exchange medium passage circulates the heat exchange medium among the heat exchange device, the exothermic body, and the gas absorbing device such that the heat exchange medium can exchange heat with the heat exchange device, the exothermic body and the gas absorbing device. The gas detector is provided at at least one of the heat exchange device and the heat exchange medium passage at a location to detect the specified gas that leaks into the heat exchange medium.

In the heat exchange system of the invention as described above, even where a specified gas leaks into the heat exchange medium, the gas detector immediately detects leakage of the gas, of which the driver can be promptly informed. Thus, the leakage of the gas into the heat exchange medium will not be left as it is, and otherwise possible deterioration of the heat exchange performance due to bubbling of the specified gas can be advantageously avoided.

The heat exchange system may further include a heat exchange medium storage device for storing at least an excess of the heat exchange medium when the amount of the heat exchange medium that circulates through the heat exchange system becomes excessive. In this case, the gas detector is provided at at least one of the heat exchange device, the heat exchange medium passage and the heat exchange medium storage device. The provision of the gas detector at the heat exchange medium storage device also yields the same advantage as described above.

Preferably, the gas detector is located at a portion of the heat exchange device or the heat exchange medium passage, which portion is higher in position than the other portions thereof or has a larger volume than the other portions thereof.

Since gas is normally likely to collect at a location that is higher in position or has a larger volume or capacity, the gas detector is preferably disposed at such a location so that leakage of the specified gas into the heat exchange medium can be more quickly and surely detected.

In one preferred embodiment of the invention, the heat exchange device comprises a radiator with a radiator cap located at the top thereof, and the gas detector is attached to the radiator cap.

In another preferred embodiment of the invention, the heat exchange medium storage device comprises a reserve tank, and the gas detector is attached to an upper portion of the reserve tank.

Where the radiator is used as the heat exchange device, and the reserve tank is used as the heat exchange medium storage device, the gas detector is located at the upper portion of the radiator or the reserve tank which is higher in position and has a larger volume or capacity and at which the specified gas leaking into the heat exchange medium is likely to collect. Also, the gas detector provided at such a location can be relatively easily detached or removed, thus facilitating maintenance or replacement of the gas detector.

The heat exchange system of the invention is preferably installed in a vehicle. In the case where a fuel cell and a hydrogen absorbing alloy tank are installed in an electric vehicle or a hybrid vehicle, for example, the heat exchange system installed in the vehicle permits early detection of any leakage of a specified gas into the heat exchange medium.

DETAILED DESCRIPTION OF PREFERRED EMBODIMENTS

Figure 1:
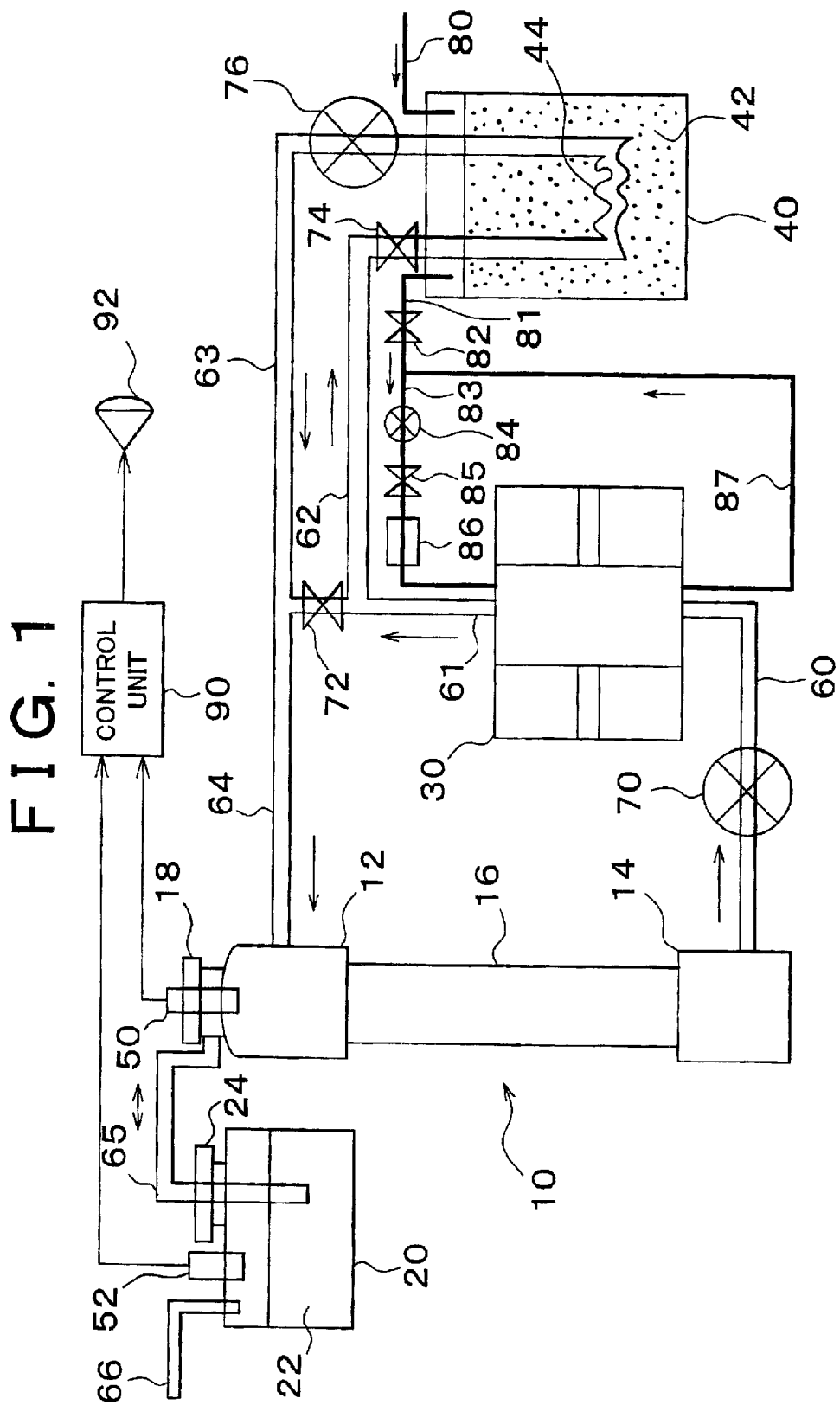
FIG. 1 is a schematic view showing a heat exchange system according to a first embodiment of the invention.

Hereinafter, presently preferred embodiments of the invention will be described. FIG. 1 is a schematic view showing a heat exchange system according to a first embodiment of the invention.

The heat exchange system of this embodiment can cool a fuel cell 30 and heat a hydrogen absorbing alloy tank 40. The heat exchange system is installed in an electric vehicle or a hybrid vehicle or the like having the fuel cell 30 and the hydrogen absorbing alloy tank 40.

As shown in FIG. 1, the heat exchange system mainly includes a radiator 10, cooling water passages 60 to 64, water pumps 70 and 76, valves 72 and 74, and a reserve tank 20, and uses cooling water as a heat exchange medium flowing through the system. As the cooling water, normal water can be used, but it is preferable to use water to which anticorrosive and/or antifreeze treatment(s) have been applied.

The radiator 10 is a heat exchange device for cooling the cooling water warmed by the fuel cell 30, and includes an upper tank 12 and a lower tank 14 for temporarily storing the cooling water, and a core 16 for passing the cooling water. Although not shown in FIG. 1, the core 16 is composed of a combination of narrow water tubes through which the cooling water runs and wavy metal plates called corrugated fins, the combination being in the form of a network.

The cooling water warmed by the fuel cell 30 flows to the upper tank 12 to be temporarily stored therein and then led to the lower tank 14 through the water tubes in the core 16 to be stored in the lower tank 14. While the cooling water passes through the water tube, the fins that are in contact with the tubes take away or dissipate the heat, to thus cool the cooling water. The fins are cooled by the breeze while the vehicle is running, or by a cooling fan (not shown) provided behind the radiator 10.

In this manner, the cooling water cooled and stored in the lower tank 14 flows out from the lower tank 14 to reach the fuel cell 30 through the cooling water passage 60. A water pump 70 is provided midway in the cooling water passage 60 so as to forcibly circulate the cooling water flowing through the cooling water passage 60. The water pump 70 and another water pump 76 which will be described later are both electrically driven.

The cooling water which has reached the fuel cell 30 enters a manifold (not shown) that allows cooling water to flow into the fuel cell 30, and is then divided into streams flowing into cooling water channels within respective single cells so as to cool the anode and cathode of each single cell. During the flow through the fuel cell 30, the cooling water itself is warmed by taking heat away from the anode and the cathode of each cell. The streams of cooling water that have passed through these cooling water channels again join together to reach a manifold (not shown) which allows the cooling water to flow out from the fuel cell 30.

The cooling water that flows out from the fuel cell 30 passes through the cooling water passage 61 and is then divided into two flow paths, one of which is led to a valve 72 and the other of which is led to a valve 74. These valves 72 and 74 selectively switch between a flow path leading the cooling water warmed by the fuel cell 30 to the hydrogen absorbing alloy tank 40 so as to heat the hydrogen absorbing alloy tank 40, and a flow path bypassing the hydrogen absorbing alloy tank 40.

For example, when the valve 72 is closed and the valve 74 is open, the warmed cooling water flows through the cooling water passage 62 into the hydrogen absorbing alloy tank 40 so as to heat the hydrogen absorbing alloy tank 40. On the contrary, when the valve 72 is open and the valve 74 is closed, the warmed cooling water bypasses the hydrogen absorbing alloy tank 40 without being used to heat the hydrogen absorbing alloy tank 40.

The hydrogen absorbing alloy tank 40 contains a hydrogen absorbing alloy 42. As is well known in the art, the hydrogen absorbing alloy 42 has the property of releasing hydrogen through an endothermic reaction when heated, and absorbing hydrogen through an exothermic reaction when cooled. Therefore, when it is desired to extract or take out absorbed hydrogen from the hydrogen absorbing alloy tank 40, warmed cooling water is supplied to the hydrogen absorbing alloy tank 40 so as to heat the hydrogen absorbing alloy 42 in the hydrogen absorbing alloy tank 40 as described above. On the other hand, when it is desired to store hydrogen in the hydrogen absorbing alloy tank 40, the temperature of the hydrogen absorbing alloy 42 in the tank 40 is lowered by stopping the supply of the warmed cooling water to the hydrogen absorbing alloy tank 40.

When the warmed cooling water is supplied to the hydrogen absorbing alloy tank 40, the cooling water flows through a cooling water tube 44 circulating within the hydrogen absorbing alloy tank 40 so as to heat the hydrogen absorbing alloy 42 in the hydrogen absorbing alloy tank 40.

After flowing out from the hydrogen absorbing alloy tank 40, the cooling water that heated the hydrogen absorbing alloy 42 is returned to the upper tank 12 of the radiator 10 through cooling water passages 63 and 64. Midway in the cooling water passage 63, the water pump 76 is provided for forcibly circulating the cooling water which has passed through the hydrogen absorbing alloy tank 40. Thus, the water pump 76 is driven when the valve 72 is closed and the valve 74 is open.

When the cooling water is not supplied to the hydrogen absorbing alloy tank 40, on the other hand, the warmed cooling water that flows out from the fuel cell 30 is returned to the upper tank 12 of the radiator 10 after passing through the valve 72 and the cooling water passage 64.

A radiator cap 18, which also serves as a pressure regulating valve, is mounted on the top of the upper tank 12, and a cooling water tube 65 extends from the radiator cap 18 to a reserve tank 20.

As shown in FIG. 1, the reserve tank 20 is a simple sealed type reserve tank, and an air intake tube 66 connects to the reserve tank 20 to maintain atmospheric pressure inside the reserve tank 20.

When the temperature of the cooling water in the upper tank 12 rises to such an extent that part of the water boils and the pressure within the upper tank 12 exceeds a predetermined level, cooling water and steam emitted from the tank 12 are pushed out through the cooling water tube 65 into the reserve tank 20. In the reserve tank 20, the steam liquefies and returns to water 22 without being actively cooled because of the low ambient temperature. Later, when the pressure inside the upper tank 12 becomes lower than the atmospheric pressure due to a decrease in the temperature of the cooling water in the upper tank 12, the cooling water flows out from the reserve tank 20 and runs back to the upper tank 12 through the cooling water tube 65.

The reserve tank 20 has a cooling water supply cap 24 mounted atop it. The cooling water supply cap 24 can be opened so that the cooling water 22 in the reserve tank 20 can be replenished when it falls below a predetermined amount.

The heat exchange system shown in FIG. 1 has been schematically described above. Hydrogen sensors 50 and 52 and so forth, which are characteristic features of the invention, will be described in detail later.

Next, a circulation path of fuel gas to be supplied from the hydrogen absorbing alloy tank 40 to the fuel cell 30 will be briefly described.

As shown in FIG. 1, a hydrogen gas is first supplied from outside to the hydrogen absorbing alloy tank 40 through a hydrogen gas inflow passage 80. At this time, if the supply of heated cooling water to the hydrogen absorbing alloy tank 40 is stopped, and the temperature of the hydrogen absorbing alloy tank 40 falls as described above, the supplied hydrogen gas is absorbed in the hydrogen absorbing alloy 42. Then, if the supply of the heated cooling water to the hydrogen absorbing alloy tank 40 is started, and the temperature inside the tank 40 rises, the hydrogen gas absorbed in the hydrogen absorbing alloy 42 is released therefrom. At this moment, a valve 82 is opened, and the released hydrogen gas is supplied to the fuel cell 30 through fuel gas passages 81 and 83 to serve as fuel gas in the cell. Midway in the fuel gas passage 83 are provided a hydrogen gas compressor 84 for circulating the hydrogen gas, a valve 85 for stopping the supply of the hydrogen gas to the fuel cell 30, and a throttle valve 86 for adjusting the amount of flow of the hydrogen gas to be supplied to the fuel cell 30. The hydrogen gas supplied to the fuel cell 30 enters a manifold for fuel gas inflow and is then divided into streams flowing into fuel gas channels within respective single cells so that the hydrogen gas is supplied to the anode of each single cell, as will be described later. The remaining hydrogen gas that was not supplied to the anode is re-collected into a manifold for fuel gas outflow and flows out from the fuel cell 30. The hydrogen gas thus discharged is returned again to the fuel gas passage 81 through a fuel gas passage 87 and circulated.

Figure 2A:
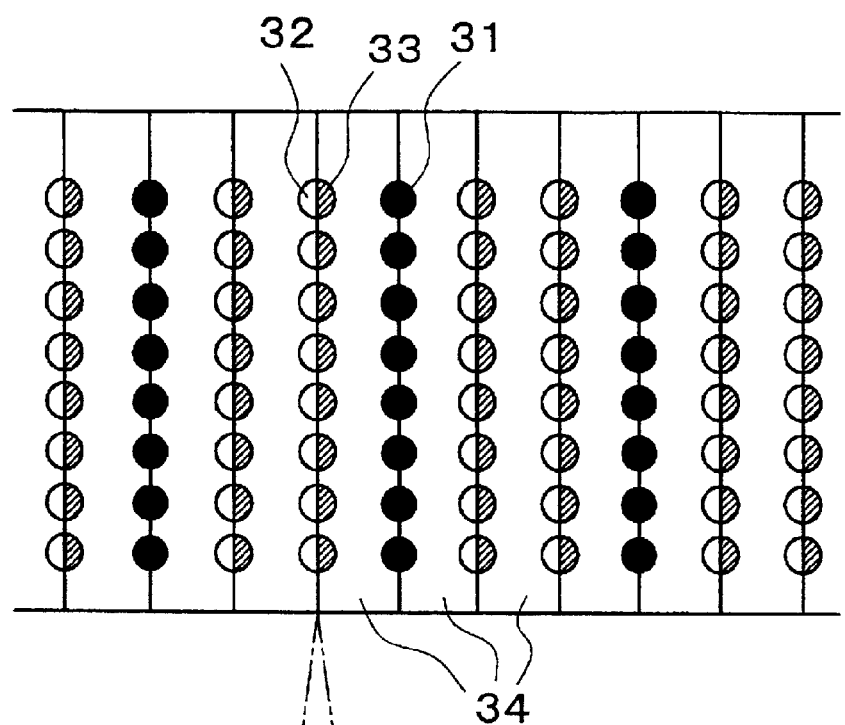
FIGS. 2A and 2B are sectional views schematically showing a stack structure and a single cell structure, respectively, of the fuel cell of FIG. 1.
Figure 2B:
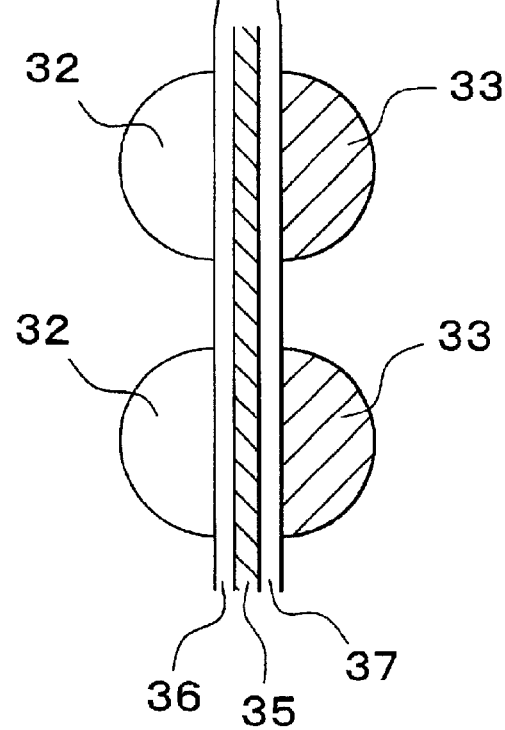

The schematic structure of the fuel cell 30 will be described hereinafter with reference to FIGS. 2A and 2B. FIGS. 2A and 2B are sectional views schematically showing stack structure and single cell structure, respectively, of the fuel cell 30 as shown in FIG. 1. FIG. 2A shows a section of the stack structure, and FIG. 2B shows a section of the single cell structure which is an enlargement of a portion of FIG. 2A including a single cell.

As shown in FIG. 2B, a single cell is composed of an electrolyte film 35, an anode 36 and a cathode 37 which are diffusion electrodes that sandwich the film 35 from both sides, and two separators 34 which sandwich the electrodes from both sides. The separators 34 have mutually opposed surfaces in which recesses are formed, and cooperate with the anode 36 and cathode 37 sandwiched between the separators 34 to form gas channels within the single cell. Of the gas channels thus formed, gas channels 32 formed between the separator 34 and the anode 36 allow hydrogen gas supplied as described above as fuel gas to pass therethrough, and gas channels 33 allow oxygen containing air, serving as oxidizing gas, to pass therethrough.

In the present embodiment, as shown in FIG. 2A, two adjacent separators 34, which are located at intervals of two single cells, are in direct contact with each other, and have recesses formed in their opposed surfaces such that cooling water channels 31 are formed between the adjacent separators 34. The cooling water supplied to the fuel cell 30 as described above is caused to flow through the cooling water channels 31.

As shown in FIG. 2A, the cooling water flowing through the cooling water channels 31 is usually completely separated from the hydrogen gas and oxidizing gas respectively flowing through the gas channels 32 and 33. However, as the fuel cell 30 is used for an extended period of time, cracks may be formed in the separators 34, or a sealing member (not shown) sealing the periphery of the separators 34 may deteriorate, causing the hydrogen gas (and/or the oxidizing gas) flowing through the gas channels 32 (and 33) to leak into the cooling water flowing through the cooling water channels 31.

In the hydrogen absorbing alloy tank 40, the supplied cooling water normally flows through the cooling water tube 44 circulating in the tank 40 while being completely separated from the hydrogen gas, as shown in FIG. 1. In some cases, however, the wall surface of the cooling water tube 44 may deteriorate after a long period of use, and the hydrogen gas present in the upper portion of the hydrogen absorbing alloy tank 40 may leak into the cooling water passing through the cooling water tube 44.

If hydrogen gas leaks into the cooling water in the above manner, the hydrogen gas turns into bubbles in the cooling water, which may possibly result in deterioration of the heat exchange performance of the entire heat exchange system.

In view of the above problem, the present embodiment adopts the following structure for detecting leakage of hydrogen gas into the cooling water early and informing the driver of the vehicle of the gas leakage.

In the heat exchange system of the present embodiment as shown in FIG. 1, the hydrogen sensor 50 is mounted in the radiator cap 18 at the top of the radiator 10, and the hydrogen sensor 52 is mounted at the top portion of the reserve tank 20. Each of the hydrogen sensors 50 and 52 detects even a very small amount of hydrogen if it is contained in the air, and outputs a detection signal.

The heat exchange system of the present embodiment further includes a control unit 90 and a hydrogen gas leakage warning lamp 92 provided on the dashboard of the driver's seat. The control unit 90 detects the leakage of hydrogen gas into the cooling water from a detection signal received from the hydrogen sensors 50 and 52, and outputs a driving signal. The hydrogen gas leakage warning lamp 92 lights up when the driving signal is received from the control unit 90.

When hydrogen gas leaks into the cooling water, the hydrogen gas turns into bubbles, which then flow through the cooling water passage together with the cooling water and collect at a portion within the heat exchange system which is higher in position and has a relatively large capacity. To be more specific, the hydrogen gas in the form of bubbles collects at the top portion of the upper tank 12 of the radiator 10, or around the radiator cap 18, which is located at the highest position in the heat exchange system. If the pressure inside the upper tank 12 is high, the cooling water is pushed out as described above from the upper tank 12 into the reserve tank 20 through the cooling water tube 65 so that the hydrogen gas caught within the upper tank 12 is also pushed out into the reserve tank 20 along with the cooling water. The hydrogen gas pushed out together with the cooling water turns into bubbles in the cooling water 22 and floats up to the surface of the water, to be present at the top of the reserve tank 20.

As described heretofore, the hydrogen sensors 50 and 52 mounted in the radiator cap 18 of the radiator 10 and in the reserve tank 20, respectively, detect hydrogen gas collected at the top of the upper tank 12 or at the top of the reserve tank 20 due to the leakage of the hydrogen gas into the cooling water, and output detection signals. Upon detecting the leakage of the hydrogen gas into the cooling water from the detection signals, the control unit 90 outputs a driving signal to the hydrogen gas leakage warning lamp 92. The lamp 92 then lights up to inform the driver that hydrogen gas is leaking into the cooling water.

Thus, in the heat exchange system of the present embodiment, if hydrogen gas leaks into the cooling water, the hydrogen sensors 50 and 52 immediately detect the leakage, and the hydrogen gas leakage warning lamp 92 informs the driver of the leakage. Once the driver notices the lighting of the lamp 92, the driver can ask for an inspection of the vehicle soon in order to get repairs or replacements and so forth as necessary. The hydrogen gas collected in the upper tank 12 of the radiator 10 and the hydrogen gas collected at the top of the reserve tank 20 can be easily discharged into the air by opening the radiator cap 18 and the cooling water supply cap 24, respectively. Moreover, the hydrogen sensors 50 and 52 are installed at sites which allow the sensors to be comparatively easily detached, which facilitates the maintenance or replacement of these hydrogen sensors.

Figure 3:
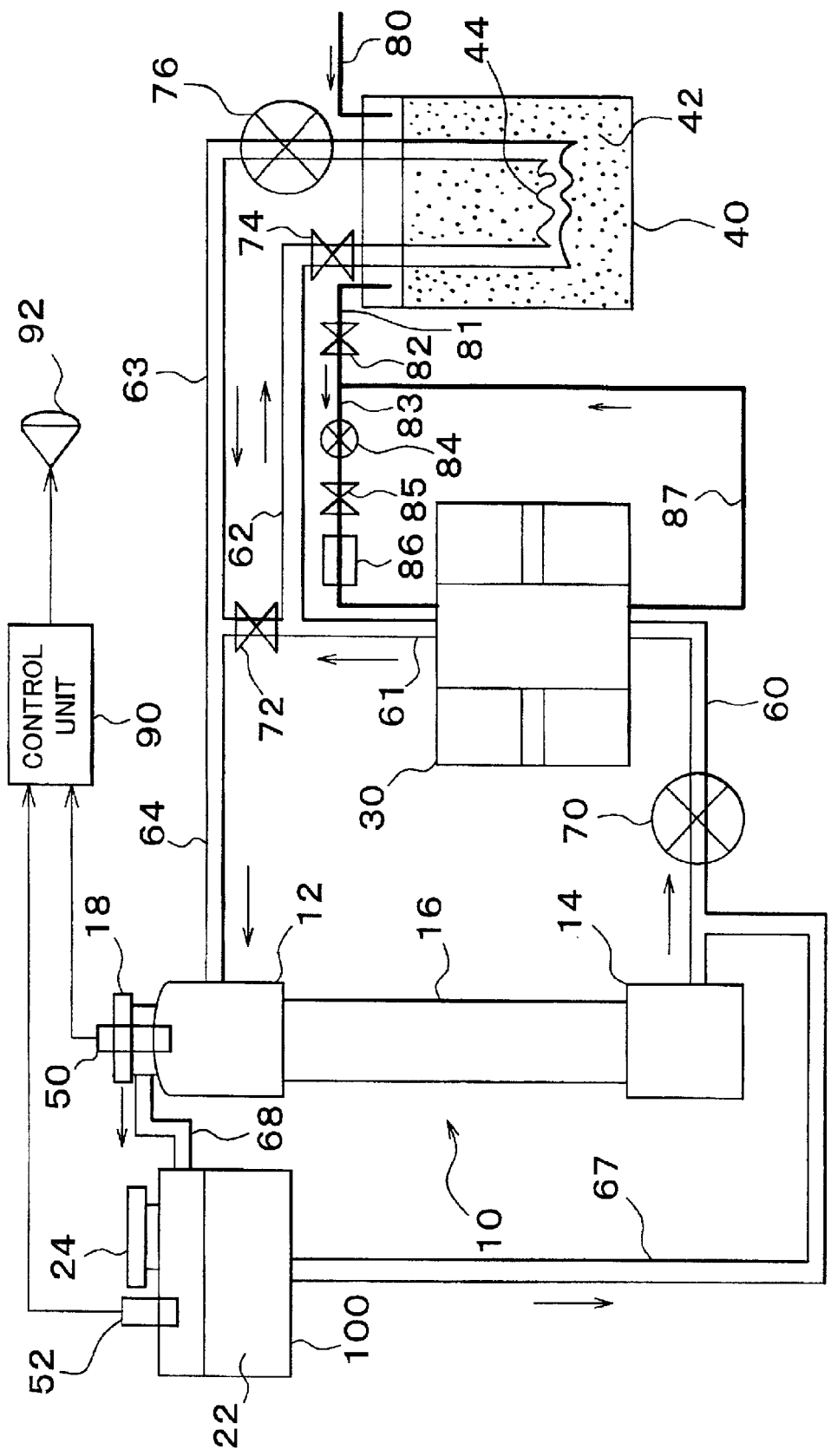
FIG. 3 is a schematic view showing a heat exchange system according to a second embodiment of the invention.

FIG. 3 is a block diagram showing the structure of a heat exchange system according to a second embodiment of the invention. The heat exchange system of the present embodiment differs from the system of the first embodiment shown in FIG. 1 in that a completely sealed type reserve tank 100 is used instead of the simple sealed type reserve tank 20. Since the other components are identical to those shown in FIG. 1, the description of these components will be omitted.

When the pressure in the upper tank 12 exceeds a predetermined level due to a rise in the temperature of the cooling water in the upper tank 12 of the radiator 10, the cooling water and steam emitted from the tank 12 flow into the reserve tank 100 through a cooling water tube 68 in the same manner as with the reserve tank 20 shown in FIG. 1. However, since the reserve tank 100 is of the completely sealed type unlike the reserve tank 20, the cooling water never returns to the upper tank 12 from the reserve tank 100 through the cooling water tube 68 even if the pressure in the upper tank 12 falls due to a decrease in the temperature of the cooling water in the upper tank 12. Instead, the cooling water 22 in the reserve tank 100 is led to the cooling water passage 60, not through the cooling water tube 68, but through a cooling water passage 67 after leaving an outlet formed at the bottom of the reserve tank 100.

Since hydrogen gas that leaks into the cooling water may collect at the top of the reserve tank 100 in the present embodiment, a hydrogen sensor 52 is provided at the top of the reserve tank 100 for detecting the leakage of the hydrogen gas. Thus, the present embodiment provides the same advantages as the first embodiment. In addition, the use of the reserve tank of the completely sealed type in the present embodiment eliminates a possibility that impurities contained in the air may be introduced into the cooling water.

Figure 4:
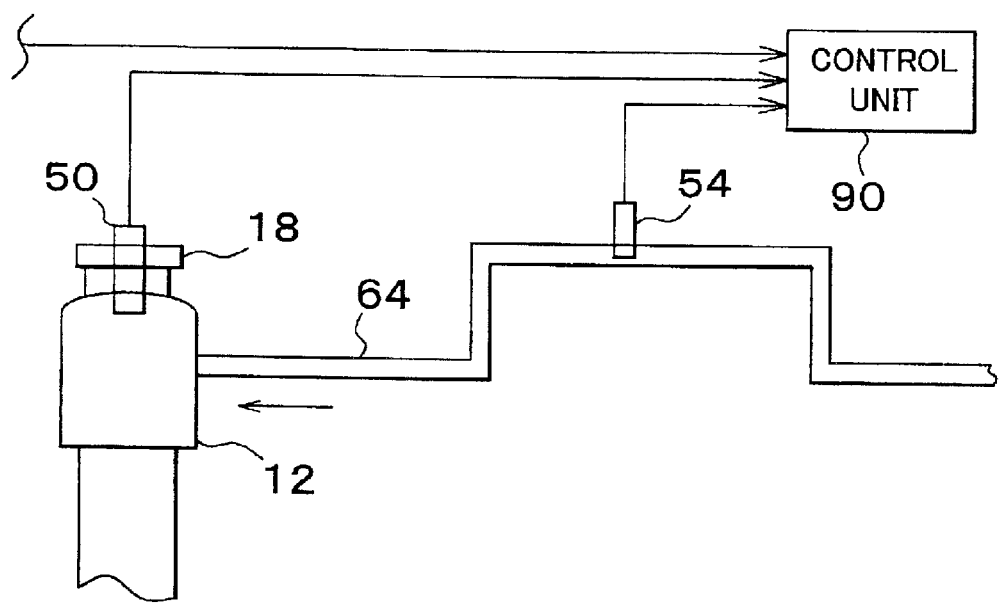
FIG. 4 is a view showing an example of another location at which a hydrogen sensor may be installed.

While the hydrogen sensors are mounted in the radiator cap 18 of the radiator 10 and at the top of the reserve tank 20, 100 in the illustrated embodiments, such a hydrogen sensor may be installed midway in a cooling water passage connecting the radiator 10 and the fuel cell 30 or the hydrogen absorbing alloy tank 40 as shown in FIG. 4.

FIG. 4 shows an example of a location at which a hydrogen sensor may be installed. In FIG. 4, a portion of the cooling water passage 64 through which the cooling water flows into the upper tank 12 of the radiator 10 forms a circuit that projects upwards so as to bypass an obstacle(s) or the like. Since the circuit portion of the passage 64 is higher in position than the other portions, it is considered that hydrogen gas that leaks into the cooling water and turns into bubbles is likely to collect at the circuit portion. In this modified example, therefore, another hydrogen sensor 54 is provided at the circuit portion of the cooling water passage 64.

Thus, the same advantages as provided in the illustrated embodiments may be obtained by providing an additional hydrogen sensor at a portion of the cooling water passage which is higher in position than the other portions.

It is to be understood that the invention is not limited to details of the illustrated embodiments, but may be embodied with various changes or improvements without departing from the scope of the invention.

In the heat exchange system of each of the above embodiments, the fuel cell 30 is cooled by using the cooling water, and the hydrogen absorbing alloy tank 40 is heated by using the cooling water that has been warmed through the cooling of the fuel cell 30. However, the invention is not restricted to this type of system. For instance, the invention is applicable to a system in which cooling water is used only to cool the fuel cell 30. In another example of the heat exchange system, the hydrogen absorbing alloy tank 40 can be heated by cooling water that has been warmed not by taking heat away from the fuel cell 30 but by cooling another heat-generating or exothermic body (auxiliary equipment or an engine in the case of a hybrid car, for example).

In the illustrated embodiments, the hydrogen sensors 50, 52, and 54 detect the presence of hydrogen in the air. However, if a sensor capable of detecting the presence of hydrogen in a liquid is developed, such a sensor could also be used. In that case, sensors could be installed at any location in the path through which the cooling water flows, without taking account of the height in position or the likelihood of collection of hydrogen gas in the form of bubbles.

While leakage of hydrogen gas into cooling water is detected by the hydrogen sensors in the illustrated embodiments, leakage of, for example, oxidizing gas into cooling water may be detected by using a gas sensor for detecting oxidizing gas.

In the illustrated embodiments, cooling water is used as a heat exchange medium. However, the invention is not restricted to this, but may use a heat exchange medium other than water.

In the above embodiments, the warning lamp 92 is used to visually inform the driver that hydrogen gas is leaking into the cooling water. Alternatively, a beeper or a speaker can be used to give notification by sound.

What is claimed is:

1. A heat exchange system, comprising:
   a fuel cell that receives a specified gas and generates electric power;
   a heat exchange device configured and positioned to perform heat exchange with a heat exchange medium;
   a heat exchange medium passage that circulates the heat exchange medium between the heat exchange device and the fuel cell such that the heat exchange medium can exchange heat with the heat exchange device and the fuel cell; and
   a gas detector configured and positioned at at least one of the heat exchange device and the heat exchange medium passage at a location to detect the specified gas that leaks into the heat exchange medium, wherein said gas detector includes a control unit able to receive a signal indicating detection of the specified gas.

2. A heat exchange system according to claim 1, wherein the gas detector is located at a portion of the heat exchange device or the heat exchange medium passage, which portion is higher in position than a remainder of the heat exchange device.

3. A heat exchange system according to claim 1, wherein the gas detector is located at a portion of the heat exchange device or the heat exchange medium passage, which portion has a larger volume than a remainder of the heat exchange device.

4. A heat exchange system according to claim 1, further comprising a warning generator connected to said controller to generate a warning when the gas detector detects leakage of the specified gas into the heat exchange medium.

5. A heat exchange system according to claim 1, wherein the specified gas comprises hydrogen, and wherein the gas detector comprises a hydrogen detector.

6. A heat exchange system according to claim 1, wherein:
   the heat exchange device comprises a radiator with a radiator cap located at the top thereof; and
   the gas detector is attached to the radiator cap.

7. A heat exchange system, comprising:
   a fuel cell that receives a specified gas and generates electric power;
   a heat exchange device configured and positioned to perform heat exchange with a heat exchange medium;
   a heat exchange medium passage that circulates the heat exchange medium between the heat exchange device and the fuel cell such that the heat exchange medium can exchange heat with the heat exchange device and the fuel cell;
   a heat exchange medium storage device configured and positioned to store at least an excess of the heat exchange medium when the amount of the heat exchange medium that circulates through the heat exchange system becomes excessive; and
   a gas detector configured and positioned at at least one of the heat exchange device, the heat exchange medium passage and the heat exchange medium storage device at a location to detect the specified gas that leaks into the heat exchange medium, wherein said gas detector includes a control unit able to receive a signal indicating detection of the specified gas.

8. A heat exchange system according to claim 7, wherein:
   the heat exchange medium storage device comprises a reserve tank; and
   the gas detector is attached to an upper portion of the reserve tank.

9. A heat exchange system according to claim 7, wherein the gas detector is located at a portion of the heat exchange device or the heat exchange medium passage or the heat exchange medium storage device, which portion is higher in position than a remainder of the heat exchange device.

10. A heat exchange system according to claim 7, wherein the gas detector is located at a portion of the heat exchange device or the heat exchange medium passage or the heat exchange medium storage device or the heat exchange medium storage device, which portion has a larger volume than a remainder of the heat exchange device.

11. A heat exchange system according to claim 7, further comprising a warning generator connected to said controller to generate a warning when the gas detector detects leakage of the specified gas into the heat exchange medium.

12. A heat exchange system according to claim 7, wherein the specified gas comprises hydrogen, and wherein the gas detector comprises a hydrogen detector.

13. A heat exchange system according to claim 7, wherein:
   the heat exchange device comprises a radiator with a radiator cap located at the top thereof; and
   the gas detector is attached to the radiator cap.

* * * * *